United States Patent [19]
Soler Perales et al.

[11] Patent Number: 5,880,200
[45] Date of Patent: Mar. 9, 1999

[54] SILICONE COMPOSITIONS HARDENABLE IN THE PRESENCE OF WATER OR AIR HUMIDITY

[75] Inventors: Jos'e Soler Perales; Jean Michel Hiriart Bodin, both of Andoain, Spain

[73] Assignee: Krafft, S.A., Guipuzocoa, Spain

[21] Appl. No.: 970,161

[22] Filed: Nov. 13, 1997

[30] Foreign Application Priority Data

Nov. 19, 1996 [EP] European Pat. Off. ............... 96500146

[51] Int. Cl.$^6$ ...................................................... C08K 5/01
[52] U.S. Cl. ................................................................ 524/490
[58] Field of Search ............................................... 524/490

[56] References Cited

U.S. PATENT DOCUMENTS 4,748,166  5/1988  Gautier ..................................... 524/486

*Primary Examiner*—Paul R. Michl
*Attorney, Agent, or Firm*—Ladas & Parry

[57] ABSTRACT

The present invention comprises the incorporation of organic cycloaliphatic type products, such as alkylcyclohexanes, in polysiloxane base compositions hardenable at room temperature. These alkylcyclohexanes have an exceptionally good compatibility with polysiloxanes and can be incorporated in significant quantities as a permanent plasticiser improving transparency.

Compounds of the alkylcyclohexane type with a molecular weight in excess of 220 are used which belong in the group having the formula

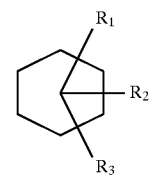

where group $R_1$ is a linear or branched alkyl radical of formula $C_nH_{2n+1}$ where n is greater than or equal to 1 and smaller than 25, and where groups $R_2$, $R_3$ can be equal to or different from each other in a same molecule and can be H and/or linear or branched alkyl radicals of formula $C_nH_{2n+1}$ where n is greater than or equal to 1 and smaller than 25.

The compositions obtained have a good stability during storage, a rapid curing and a good resistance to yellowing of the hardened product.

5 Claims, No Drawings

SILICONE COMPOSITIONS HARDENABLE IN THE PRESENCE OF WATER OR AIR HUMIDITY

The present invention relates to organopolysiloxane base compositions hardenable at temperatures below 50° C. in the presence of water or air humidity. These compositions, known as RTV or silicone sealants, are used as binders, moulding masses or waterproofing products and form an elastomer after hardening at room temperature.

These compositions primarily consist of an α, w dihydroxy polydiorganosiloxane, one or several reticulating agents containing more than two reactive groups per molecule, capable of reacting with water and silanol groups and generally containing an accelerator.

In order to modify the characteristics of hardenable compositions for specific applications, non-reactive polysiloxanes, such as α, w trimethyl polydimethylsiloxanes, thixotropy agents such as pyrogenic silicas, mineral charges, biocides, UV absorbers, pigments, etc. may be incorporated.

Undoubtedly, due to the high cost of polysiloxanes, the incorporation of organic plasticisers in these compositions appears to be a very advantageous possibility. The incorporation of these components moreover allows characteristics such as transparency, paintability, etc. to be improved.

An attempt has previously been made at using organic substances such as adipates, polybutenes, etc. in compositions vulcanising at room temperature.

Generally, the scarce compatibility of polysiloxanes with other raw materials does not allow hardenable compositions to be made containing a high quantity of organic plasticisers without losing transparency and/or without exudation phenomena taking place.

When the organic products have a good compatibility with polysiloxanes, they generally have a low molecular weight and a high volatility that renders them unsuitable as permanent plasticisers.

For instance, U.S. Pat. No. 4,357,438 describes the use of small quantities of cyclic or paraffinic compounds to improve the paintability of polysiloxane base compositions hardenable with amidoalkylethoxysilanes. These paraffinic compounds containing less than 24 carbon atoms have an excessively high volatility and would yield a loss of weight and a very high volume shrinkage in hardenable compositions containing significant quantities thereof. The same would happen with the only cyclic compound mentioned in this patent, namely cyclohexane, which is extremely volatile.

Indeed, the patent claims the use of quantities of these compounds in the overall composition that are always below 15%.

U.S. Pat. No. 4,312,801 describes the use of alkylaromatic compounds. These compounds, which have a good compatibility with polysiloxanes and little volatility, have been successfully used for years, primarily to improve the transparency of hardenable compositions. They are however inconvenient in their low resistance to sunlight and the hardened compositions containing the same can with time be yellowed. Protecting these compositions with additives is economically costly and, depending on the nature of the alkylaromatic compounds, does not always suffice to avoid an aged colour change.

The present invention is based upon the incorporation of organic cycloaliphatic type products, namely alkylcyclohexanes, in polysiloxane base compositions hardenable at room temperature.

We have surprisingly found that alkylcyclohexanes have an exceptionally good compatibility with polysiloxanes, very similar to their alkylaromatic homologues, and significant quantities may be incorporated as polysiloxanes without producing exudation phenomena or causing a yellowing of the hardened composition under sunlight.

In accordance with the invention, alkylcyclohexane type compounds with a molecular weight in excess of 220 are used in order to limit or eliminate evaporation losses when the hardened compositions are subjected to high room temperatures.

The alkylcyclohexanes aforesaid do not take part in the hardening reaction of polysiloxanes and substitute the non-reactive silicone fluids normally used to plasticise hardened compositions.

The alkylcyclohexanes with a molecular weight of 220 which may be used for obtaining polysiloxane base hardenable compositions can belong in the group having the following generic formula:

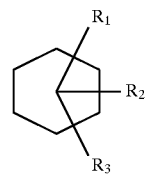

Group $R_1$ is a linear or branched alkyl radical of formula $C_nH_{2n+1}$ where n is greater than or equal to 1 and smaller than 25.

Groups $R_2$, $R_3$ can be equal to or different from each other in a same molecule and can be H and/or linear or branched alkyl radicals of formula $C_nH_{2n+1}$ where n is greater than or equal to 1 and smaller than 25.

In accordance with the invention, the polysiloxane base hardenable compositions can contain one or several products belonging in the group aforesaid.

These mono, di or trialkylcyclohexane components are not yet commercially available in industrial quantities but may be very economically prepared by severe hydrogenation of the corresponding alkylbenzenes.

We have made this hydrogenation using a catalyser with 56% Ni, temperatures between 150° C. and 175° C., a pressure of 3.2 MPa, a spatial velocity (LHSV) of 2 and an $H_2$/HC ratio of 5.5.

Particularly advantageous alkylcyclohexanes worthy of note are monoalkylcyclohexanes such as decylcyclohexane, undecylcyclohexane, dodecylcyclohexane, tridecylcyclohexane and tetradecylcyclohexane, heavy alkylcyclohexanes produced by hydrogenation of heavy alkylates obtained in the manufacture of linear and/or branched dodecylbenzenes. These heavy alkylcyclohexanes contain a large quantity of components principally formed by mono and dialkylcyclohexanes.

The alkylcyclohexane compounds have a very good compatibility with polysiloxanes, are scarcely volatile, have a low cost and are resistent to ultraviolet light attack, which enables them to be used in significant quantities and very transparent polysiloxane base hardenable compositions not yellowing under sunlight to be obtained.

In accordance with the present invention, polysiloxane base compositions are obtained which may be stored in the absence of humidity and hardening in the presence of humidity to form an elastomer. They are used as moulding or waterproofing agents.

The compositions primarily contain:

Polysiloxanes with silanol groups, a reticulating agent and a catalyser accelerating hardening of the composition in the presence of humidity.

These compositions can contain plasticisers and/or thixotropy agents and/or binding agents and/or mineral charges and/or pigments and/or solvents and/or antioxidant additives, etc. and be primarily used as waterproofing, encapsulating, moulding or coating masses.

The components of the polysiloxane base compositions are known and commonly used.

The polysiloxanes with silanol groups used are preferably α, w-dihydroxy polydimethylsiloxanes with a viscosity ranging between 1 000 and 500 000 mPas at 25° C. and α, w trimethylpolydimethylsiloxanes as plasticiser with viscosities ranging between 50 and 10 000 mpas at 25° C.

The reticulating agent used may be acetoxysilanes, alcoxysilanes, aminosilanes, oxymosilanes, amidosilanes, etc.

The charges used are preferably silicas, calcium carbonates, quartz, diatom earths, etc.

The compositions in accordance with the present invention are characterised by containing alkylcyclohexanes with a molecular weight in excess of 220 and are used in quantities of 5 to 50 parts of the overall mixture.

The compositions thus obtained are characterised by a good stability during storage, a rapid curing and a good resistance to yellowing of the hardened product.

EXAMPLE 1

A translucent waterproofing composition is prepared in an anaerobic environment to serve as reference, with a 45% content of α, w dihydroxy polydimethylsiloxanes with a viscosity of 70 000 mpas, 40% α, w trimethyl polydimethylsiloxane with a viscosity of 1 000 mpas, 5% triacetoxylsilane and 10% pyrogenic silica (specific surface BET 150 m$^2$/g). This composition can be stored in sealed containers and the hardening process begins when the composition comes in contact with environmental humidity.

The characteristics of this composition and those of examples 2 and 3 are shown on table I.

EXAMPLE 2

A composition similar to that of example 1 is prepared, substituting 85% of the silicone fluid (34% of the preparation) with a tridecylcyclohexane obtained by total hydrogenation of the linear tridecylbenzene resulting from the manufacture of linear alkylbenzenes (LAB) and consisting of a mixture of isomers of formula $C_{13}H_{27}C_6H_{11}$.

A waterproofing composition is obtained that is very transparent, easy to extrude, very stable in storage and with little evaporation shrinkage.

EXAMPLE 3

A translucent waterproofing composition is prepared in an anaerobic environment with a content of 45% α, w dihydroxy polydimethylsiloxane with a viscosity of 70 000 mpas, 20% α, w trimethyl polydimethylsiloxane with a viscosity of 1 000 mpas, 20% alkylcyclohexane with a molecular weight of 350 consisting of a mixture of mono and dialkyl cyclohexanes and obtained by hydrogenating a heavy alkylate resulting from the manufacture of dodecylbenzene, 5% methyl trys(methylethylketoxime) silane and 10% pyrogenic silica (specific surface BET 150 m$^2$/g). This composition may be stored in sealed containers and the hardening process begins when the compositions comes in contact with environmental humidity.

A transparent waterproofing hardenable composition is obtained that is easy to extrude, very stable in storage and with little evaporation shrinkage.

TABLE I

Characteristics of the hardened composition

|  |  | Example 1 | Example 2 | Example 3 |
|---|---|---|---|---|
| $E_{100}$ | MPa | 0.22 | 0.23 | 0.25 |
| Tensile strength | MPa | 1.4 | 1.3 | 0.7 |
| Ultimate elongation | % | 650 | 650 | 450 |
| Hardness | Shore A | 15 | 14 | 17 |
| Loss of volume 7 days at 70° C. | % | 4 | 7.5 | 6 |

Table I shows that relatively high quantities of alkylcyclohexanes can be used in hardenable polysiloxane compositions whilst maintaining low volume losses at 70° C. A large variety of reticulation systems can also be used.

We claim:

1. A silicone composition hardenable at a temperature below 50° C. in the presence of water or air humidity obtained by mixing α, w polydiorganosiloxane, one or several reticulating agents containing an average of more than two groups per molecule capable of reacting with silanol groups and optionally accelerators, charges, non-reactive polysiloxanes as plasticisers, pigments and other additives, characterised by containing alkylcyclohexanes with a molecular weight in excess of 220 in a proportion of 5 to 50 parts on the overall mixture.

2. A silicone composition hardenable at a temperature below 50° C. in the presence of water or air humidity, as in claim 1, characterised in that the alkylcyclohexanes with a molecular weight in excess of 220 which may be used belong in the group having the following generic formula

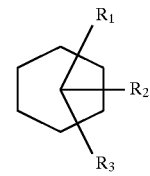

where group $R_1$ is a linear or branched alkyl radical of formula $C_nH_{2n+1}$ where n is greater than or equal to 1 and smaller than 25, and where groups $R_2$, $R_3$ can be equal to or different from each other in a same molecule and can be H and/or linear or branched alkyl radicals of formula $C_nH_{2n+1}$ where n is greater than or equal to 1 and smaller than 25.

3. A silicone composition hardenable at a temperature below 50° C. in the presence of water or air humidity, as in claim 1, essentially characterised in that monoalkylcyclohexanes such as decylcyclohexane, undecylcyclohexane, dodecylcyclohexane, tridecylcyclohexane or tetradecylcyclohexane may be used as particularly advantageous alkylcyclohexanes.

4. A silicone composition hardenable at a temperature below 50° C. in the presence of water or air humidity, as in claim 1, essentially characterised in that dialkylcyclohexanes such as didecylcyclohexane, decylundecylcyclohexane or didodecylcyclohexane may be used as particularly advantageous alkylcyclohexanes.

5. A silicone composition hardenable at a temperature below 50° C. in the presence of water or air humidity, as in claim 1, essentially characterised in that heavy alkylcyclohexanes produced by hydrogenating the heavy alkylates obtained in the manufacture of linear and/or branched dodecylbenzene and which contain a large quantity of components principally formed by mono and dialkylcyclohexanes may be advantageously used.

* * * * *